US012750648B2

(12) United States Patent
De Angeli et al.

(10) Patent No.: US 12,750,648 B2
(45) Date of Patent: Sep. 29, 2026

(54) BLUETOOTH RADIO ARCHITECTURE FOR IMPROVED DATA TRANSFER FROM MEDICAL DEVICES

(71) Applicant: Flextronics AP, LLC, San Jose, CA (US)

(72) Inventors: Marco De Angeli, Barzana (IT); Antonino Bongiovanni, San Jose, CA (US); Salvatore Forte, Milan (IT); Annalisa Torquati, San Jose, CA (US)

(73) Assignee: Flextronics AP, LLC, San Jose, CA (US)

( * ) Notice: Subject to any disclaimer, the term of this patent is extended or adjusted under 35 U.S.C. 154(b) by 213 days.

(21) Appl. No.: 18/802,124

(22) Filed: Aug. 13, 2024

(65) Prior Publication Data

US 2025/0119718 A1 Apr. 10, 2025

Related U.S. Application Data

(60) Provisional application No. 63/587,835, filed on Oct. 4, 2023.

(51) Int. Cl.

| | |
|---|---|
| ***H04W 4/80*** | (2018.01) |
| ***H03K 9/00*** | (2006.01) |
| ***H04L 67/12*** | (2022.01) |
| ***H04W 4/00*** | (2018.01) |
| ***H04W 8/00*** | (2009.01) |

(52) U.S. Cl.

CPC ............... *H04W 4/80* (2018.02); *H04L 67/12* (2013.01)

(58) Field of Classification Search

None

See application file for complete search history.

(56) References Cited

U.S. PATENT DOCUMENTS

| | | | | |
|---|---|---|---|---|
| 9,124,249 | B1 * | 9/2015 | Schmalz | H04W 48/16 |
| 10,056,961 | B1 * | 8/2018 | Haverinen | H04B 7/10 |
| 11,218,857 | B2 * | 1/2022 | Adler | H04W 4/80 |
| 11,750,235 | B2 * | 9/2023 | Quinlan | H04B 1/1607 375/262 |
| 12,058,608 | B2 * | 8/2024 | Yamada | H04W 4/02 |
| 12,137,400 | B1 * | 11/2024 | Kozin | H04W 8/005 |
| 12,587,040 | B2 * | 3/2026 | Lee | H02J 50/80 |
| 2014/0355517 | A1 * | 12/2014 | Reunamaki | H04W 8/005 370/328 |

(Continued)

OTHER PUBLICATIONS

International Search Report and Written Opinion for International Application No. PCT/US2024/049917 dated Jan. 28, 2025, 14 pages.

*Primary Examiner* — Tuan A Tran

(74) *Attorney, Agent, or Firm* — Volpe Koenig

(57) ABSTRACT

An assembly for wirelessly transmitting data using a Bluetooth low energy architecture is disclosed. The assembly can include a medical device and a hub. The medical device can include an advertiser configured to wirelessly transmit or send data related to the medical device. The hub can include a scanner for receiving data from the advertiser. The scanner can include at least a first receiver with a first radio, a second radio, and a third radio. The first receiver can be configured to simultaneously scan for a plurality of radio channels utilizing the first radio, the second radio, and the third radio, and the first receiver can be configured to simultaneously receive data from the advertiser over the plurality of radio channels.

20 Claims, 4 Drawing Sheets

(56) References Cited

U.S. PATENT DOCUMENTS

| | | | | |
|---|---|---|---|---|
| 2018/0227721 | A1 | 8/2018 | Kwan et al. | |
| 2020/0238089 | A1* | 7/2020 | Demmer | H04L 43/103 |
| 2021/0063521 | A1* | 3/2021 | Hallonsten | G01S 5/12 |
| 2022/0070247 | A1* | 3/2022 | Wang | G06F 3/165 |
| 2022/0225879 | A1* | 7/2022 | Wu | G06F 12/0238 |

* cited by examiner

BLUETOOTH RADIO ARCHITECTURE FOR IMPROVED DATA TRANSFER FROM MEDICAL DEVICES

CROSS REFERENCE TO RELATED APPLICATIONS

This application claims the benefit of U.S. Provisional Application No. 63/587,835 filed on Oct. 4, 2023, which is incorporated by reference as if fully set forth.

FIELD OF THE INVENTION

The present disclosure is directed to Bluetooth radio architectures, and more particularly it is directed to Bluetooth radio architectures with improved data transfer for medical devices.

BACKGROUND OF THE INVENTION

Bluetooth Low Energy (BLE) beacons have advantages and disadvantages compared to traditional or classic Bluetooth. A disadvantage of BLE beacons is that they transmit less data over a smaller range, compared to classic Bluetooth. An advantage of BLE beacons is that they consume much less energy than classic Bluetooth, and therefore require smaller and/or less energy from a power source. Further, a disadvantage of BLE beacons is that they transfer small amounts of data at regular intervals of time, resulting in many data packets being lost during transmission.

As such, there is a need for a solution that reduces the amount of data packets lost during transmission, therefore improving the reliability and connection range of the BLE beacons.

SUMMARY OF THE INVENTION

According to one aspect, the present disclosure is directed to an assembly for wirelessly transmitting data using a Bluetooth low energy architecture. The assembly can include a medical device and a hub. The medical device can include an advertiser configured to wirelessly transmit or send data related to the medical device. The hub can include a scanner for receiving data from the advertiser. The scanner can include at least a first receiver with a first radio, a second radio, and a third radio. The first receiver can be configured to simultaneously scan for a plurality of radio channels utilizing the first radio, the second radio, and the third radio, and the first receiver can be configured to simultaneously receive data from the advertiser over the plurality of radio channels.

BRIEF DESCRIPTION OF THE DRAWINGS

The foregoing Summary as well as the following Detailed Description will be best understood when read in conjunction with the appended drawings, which illustrate a preferred embodiment of the disclosure. In the drawings.

DETAILED DESCRIPTION OF THE PREFERRED EMBODIMENTS

Figure 1:
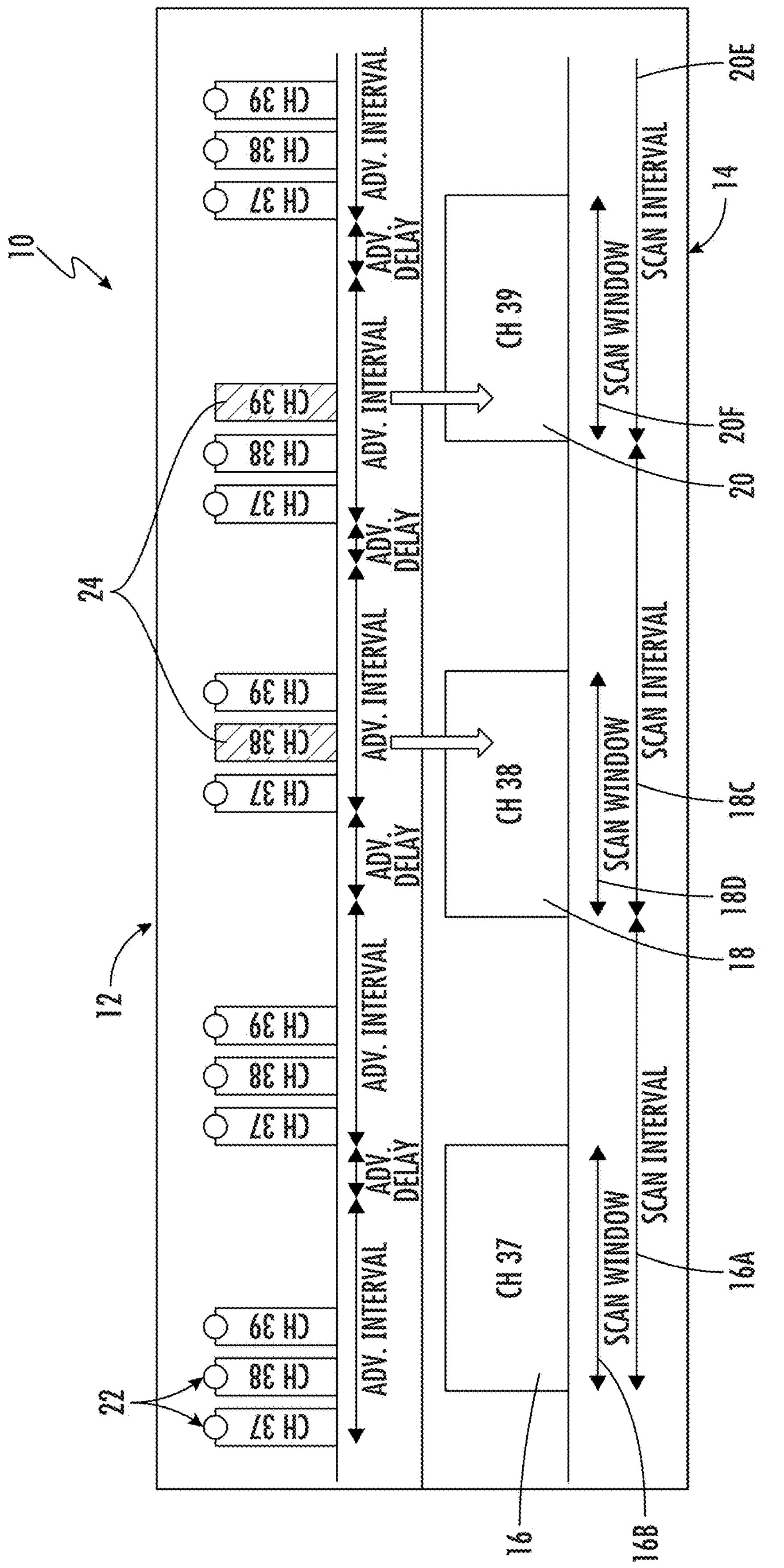
FIG. 1 PRIOR ART
FIG. 1 is a schematic illustration of a prior art BLE Beacon architecture including a single receiver architecture.

Certain terminology is used in the following description for convenience only and is not limiting. The words “front”, “rear”, “upper”, and “lower” designate directions in the drawings to which reference is made. The words “inwardly” and “outwardly” refer to directions towards and away from parts referenced in the drawings. “Axially” refers to a direction along the axis of an axle, shaft, pin, or the like. A reference to a list of items that are cited as “at least one of a, b, or c” (where a, b, and c represent the items being listed) means any single one of the items a, b, or c, or combinations thereof are included. The terms “about” and “approximately” encompass+/−10% of an indicated value unless otherwise noted. The term “generally” in connection with a radial direction encompasses+/−25 degrees. The terminology includes the words specifically noted above, derivatives thereof, and words of similar import.

FIG. 1 is a schematic illustration of a prior art Bluetooth Low Energy (BLE) Beacon 10 including a single receiver architecture. The prior art BLE Beacon 10 includes an advertiser 12 and a scanner 14. The advertiser 12 is configured to send data packets including data or information out for reception by the scanner 14. In the illustrated example, the advertiser 12 is configured to transmit or send information across three radio channels, which in this example are CH. 37, CH. 38, and CH. 39. In other examples, the advertiser 12 can be configured to transmit or send information across more or less than three radio channels. Further, in other examples, the advertiser 12 can be configured to transmit or send information across radio channels other than CH. 37, CH. 38, and CH. 39. Further, as illustrated, the advertiser 12 transmits or sends information across the three radio channels for an advertising interval (timeframe), and then there is an advertising delay (timeframe) before the next advertising interval begins transmitting again. The specific advertising interval and advertising delay can depend on each specific configuration. Further, as illustrated, during each advertising interval the advertiser 12 sends or transmits information across each of the radio channels CH. 37, CH. 38, and CH. 39.

The scanner 14 includes a first receiver 16, a second receiver 18, and a third receiver 20. Each of the receivers 16, 18, and 20 are configured to scan for data or information sent from the advertiser 12. More specifically, each of the receivers 16, 18, and 20 are configured to scan for data or information within a specific radio channel. In the illustrated example, the first receiver 16 is configured to scan for the radio channel CH. 37, the second receiver 18 is configured to scan for the radio channel CH. 38, and the third receiver 20 is configured to scan for the radio channel CH. 39. In other examples, the receivers 16, 18, and 20 can be configured to scan for single radio channels other than radio channels CH. 37, CH. 38, and CH. 39, respectively, depending on the desired configuration.

Additionally, each of the receivers 16, 18, and 20 are configured to have a scan interval and a scan window. The scan interval is the timeframe in which the specific receiver 16, 18, or 20 is scanning, and the scan window is the timeframe in which the specific receiver 16, 18, or 20 can actually receive data or information from the advertiser 12. As such, referring still to FIG. 1, it is illustrated that the first receiver 16 includes a scan interval 16A, which is a timeframe in which the first receiver 16 is in a scanning mode. Further, the first receiver 16 can receive data or information within the scan window 16B, which is a timeframe within the scan interval 16A, and the scan window 16B is less than the timeframe of the scan interval 16A. As discussed, the scan window 16B of the first receiver 16 is the timeframe in which the first receiver 16 can receive data or information from the advertiser 12. It is to be understood that the aforementioned disclosure regarding the first receiver 16 equally applies to the second receiver 18 and the third receiver 20, and that the previous disclosure will not be repeated for each receiver in an effort to avoid redundancy.

The advertising intervals of the advertiser 12 are configured to be sent at regular intervals of time, but the scan windows of the receivers 16, 18, and 20 do not always match or align with the advertising intervals of the advertiser 12. As such, when the advertiser 12 sends data or information across the radio channels CH. 37, CH. 38, and CH. 39 within a certain advertising interval, the scan window 16B, 18D, and 20F of the receivers 16, 18, and 20, respectively, may not align with the advertising interval and the specific receiver may receive none of the data or information, or may only receive some of the data or information while the rest of the data or information is lost during transmission.

Referring specifically to the example illustrated in FIG. 1, it is illustrated that the first receiver 16 is configured to scan for the single radio channel CH. 37 during the scan window 16B, while at the same time the advertiser 12 is in the process of transmitting or sending data or information. As illustrated, during the scan window 16B, the first receiver 16 does not receive any data or information over the radio channel CH. 37, but rather the first receiver 16 is only transmitted data or information over radio channels CH. 38 and CH. 39, which the first receiver 16 is not configured to receive. As such, during the scan window 16B the first receiver 16 does not receive any data or information from the advertiser 12, and therefore the data or information sent over radio channels CH. 38 and CH. 39 are all lost data packets 22.

The second receiver 18 is configured to scan for the single radio channel CH. 38 during the scan window 18D, while at the same time the advertiser 12 is in the process of transmitting or sending data or information. As illustrated, during the scan window 18D, the second receiver 18 does not receive the data or information transmitted over radio channels CH. 37 and CH. 39 because the second receiver 18 is not configured to receive data or information over radio channels CH. 37 and CH. 39. But the second receiver 18 does receive data and information transmitted by advertiser 12 over radio channel CH. 38, as received data packets 24, during the scan window 18D of the second receiver 18. As such, during the scan window 18D the second receiver 18 receives some data from radio channel CH. 38, as received data packets 24, but the data sent over radio channels CH. 37 and CH. 39 ends up being lost data packets 22.

The third receiver 20 is configured to scan for the single radio channel CH. 39 during the scan window 20F, while at the same time the advertiser 12 is in the process of transmitting or sending data or information. As illustrated, during the scan window 20F, the third receiver 20 does not receive the data or information transmitted over radio channel CH. 37 because the third receiver 20 is not configured to receive data or information over radio channel CH. 37. But the third receiver 20 does receive data and information transmitted by advertiser 12 over radio channel CH. 39, as received data packets 24, during the scan window 20F of the third receiver 20. As such, during the scan window 20F the second receiver 18 receives some data from radio channel CH. 39, as received data packets 24, but the data sent over radio channel CH. 37 ends up being lost data packets 22.

Therefore, the prior art BLE Beacon 10 transmits information by sending data across three radio channels, while the receivers 16, 18, and 20 are scanning across the three radio channels during differing intervals of time (i.e., scan windows 16B, 18D, and 20F). The probability of having a receiver 16, 18, and 20 listening on the same radio channel used by the advertiser 12, within an overlapping advertising interval and a scan window 16B, 18D, and 20F, is low and therefore several data packets are lost during transmission. The prior art BLE Beacon 10 results in many lost data packets 22, which results in low reliability with regards to accurate data transfer from the advertiser 12 to the scanner 14.

Figure 2:
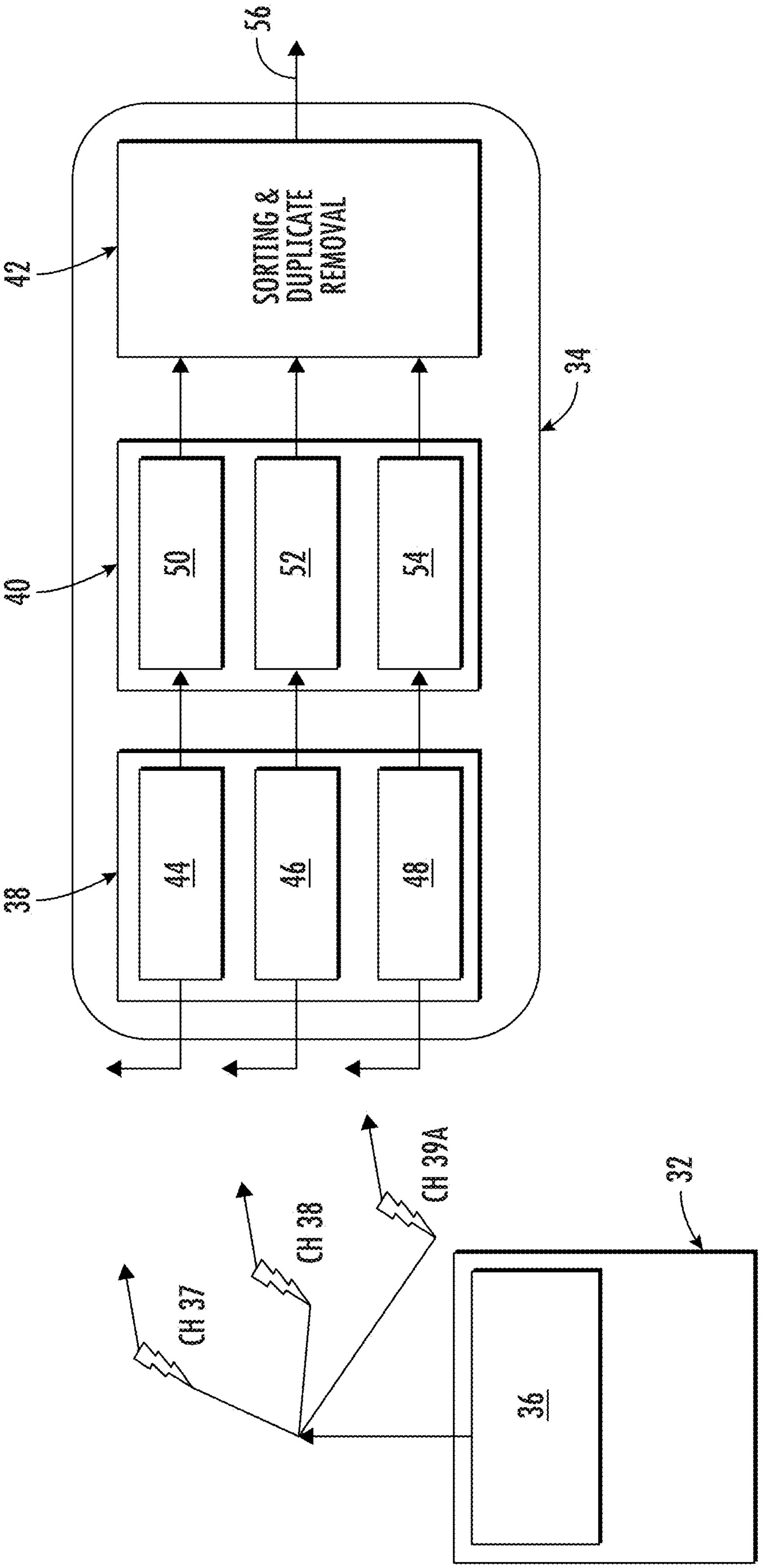
FIG. 2 is schematic illustration of a medical device and a hub including a fixed triple channel receiver architecture according to the present disclosure.
Figure 3:
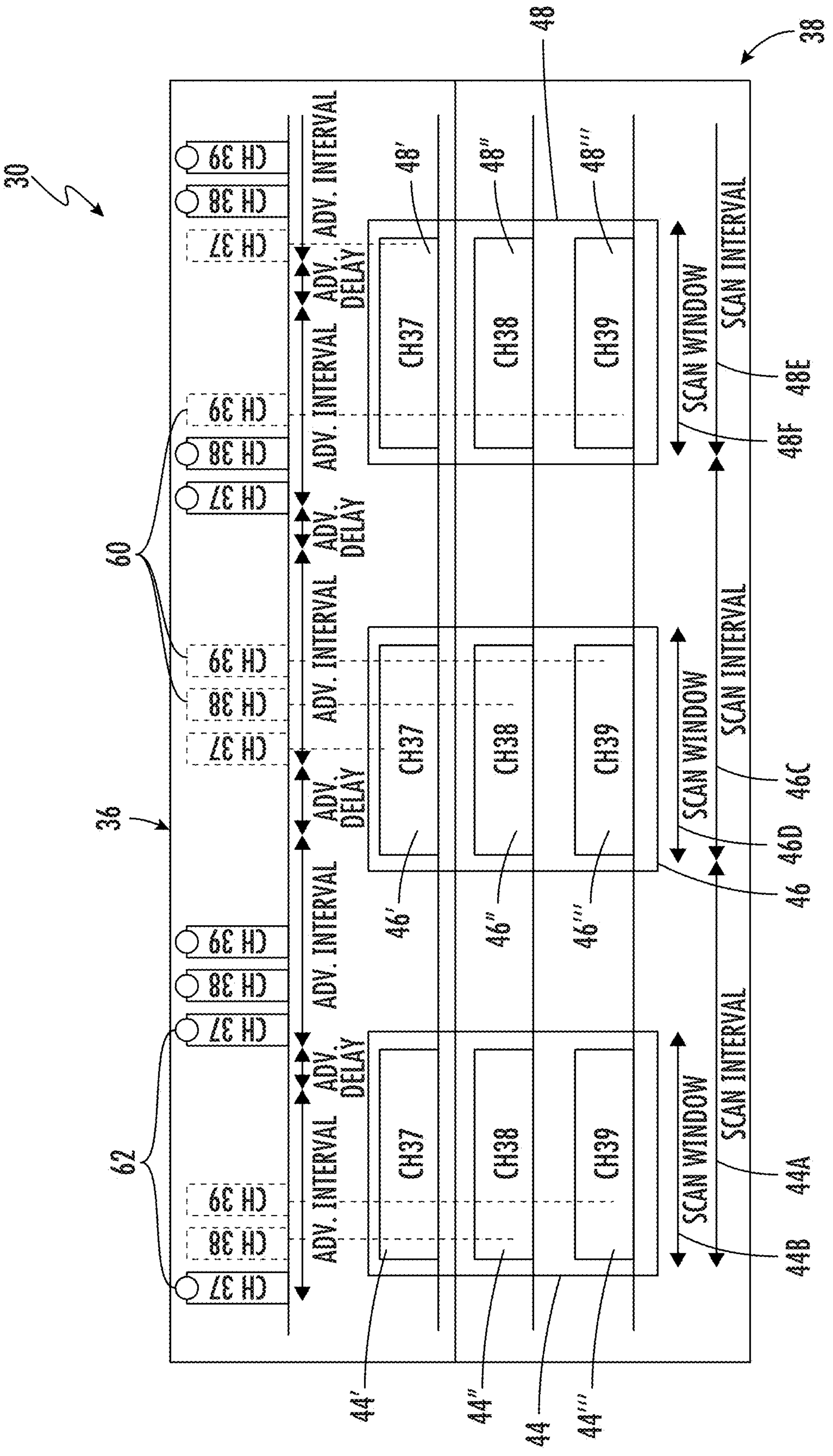
FIG. 3 is schematic illustration of a BLE Beacon architecture including the fixed triple channel receiver architecture according to the present disclosure.

FIG. 2 is schematic illustration of a medical device 32 and a hub 34 including a fixed triple channel receiver architecture according to the present disclosure. FIG. 3 is schematic illustration of a BLE Beacon 30 including the fixed triple channel receiver architecture according to the present disclosure. FIGS. 2-3 will be discussed together.

As illustrated in FIG. 2, the BLE Beacon 30 of the present disclosure includes a medical device 32 and a hub 34. In some examples, the medical device 32 can be a disposable medical device 32 that acts as a beacon and relies on BLE advertisement packets to send its status to a central cloud, via a BLE gateway. Due to the disposable nature of the disposable medical device 32, utilizing cheaper (less expensive) BLE technology rather than classic Bluetooth results in an overall cheaper (less expensive) medical device 32. The medical device 32 can include an advertiser 36, similar to the advertiser 12 discussed with reference to the prior art in FIG. 1. Specifically, the advertiser 36 can transmit data or information by sending it across three radio channels CH. 37, CH. 38, and CH. 39. Further, the advertiser 36 transmits or sends information across the three radio channels for an advertising interval (timeframe), and then there is an advertising delay (timeframe) before the next advertising interval begins transmitting again. The aforementioned intervals repeat over and over during transmitting by the advertiser 36, similar to the advertiser 12 discussed with reference to the prior art in FIG. 1.

The hub 34 of the present disclosure is utilized to receive, buffer, and process data from the advertiser 36 of the medical device 32. Specifically, the hub 34 includes a scanner 38, a buffer 40, and a processor 42. The scanner 38 is similar to the scanner 14 of the prior art, and the scanner 38 includes a first receiver 44, a second receiver 46, and a third receiver 48. One of the primary advantages of the present disclosure can be seen in the functionality of the scanner 38 of the present disclosure, and more specifically in the functionality of the receivers 44, 46, and 48 of the scanner 38, discussed further below. In general, the receivers 44, 46, and 48 are configured to receive data and information transmitted by the advertiser 36 of the medical device 32. The buffer 40 includes a first buffer 50, a second buffer 52, and a third buffer 54. The buffers 50, 52, and 54 are configured to temporarily store and pre-process data received from the receivers 44, 46, and 48, respectively. The processor 42 is configured to receive the stored and pre-processed data from the buffers 50, 52, and 54. Then the processor 42 is configured to sort and remove duplicate data, compile the data into the desired output data, and transfer the data through an output 56 of the hub 34 for viewing and analysis by a user or other device.

Therefore, the medical device 32 of the present disclosure is configured to transmit data and information, utilizing the advertiser 36, to the hub 34. The hub 34 is configured to receive the data through the scanner 38, store and pre-process the data in the buffer 40, and then sort, compile, and output the data for viewing and analysis by a user or other device. The hub 34 is configured such that the hub 34 enables the recovery of lost data packets by improving the reliability of the data transfer and by increasing the data transfer connection range, discussed in detail below with reference to FIG. 3. In some examples, the hub 34 can reduce the amount of lost data packets by about 55%, compared to previous approaches. Therefore, the hub 34 improves the reliability and connection range of a medical device 32 to a BLE gateway. The details regarding how the advantages are achieved is discussed in detail below with reference to FIG. 3.

Referring now to FIG. 3, which is a schematic illustration of a BLE Beacon 30 including the fixed triple channel receiver architecture according to the present disclosure. One of the primary advantages of the present disclosure can be seen in the functionality of the scanner 38 of the present disclosure, and more specifically in the functionality of the receivers 44, 46, and 48 of the scanner 38, discussed below.

Here, each of the receivers 44, 46, and 48 are configured to simultaneously scan for each of the three radio channels CH. 37, CH. 38, and CH. 39. Specifically, each of the receivers 44, 46, and 48 include three radios, and each radio is configured to simultaneously scan and listen for a fixed radio channel. The first receiver 44 includes a first radio 44', a second radio 44", and a third radio 44'". The second receiver 46 includes a first radio 46', a second radio 46", and a third radio 46'". The third receiver 48 includes a first radio 48', a second radio 48", and a third radio 48". As such, the receivers 44, 46, and 48 of the present disclosure are each configured to simultaneously scan for three radio channels (in this case radio channels CH. 37, CH. 38, and CH. 39). In contrast, the prior art scanners 14 include single receiver architectures (with only a single radio in each receiver) and are only capable of scanning for a single radio channel (CH. 37, CH. 38, or CH. 39) at a time. Therefore, each of the receivers 44, 46, and 48 of the present disclosure include a fixed triple (radio) channel receiver architecture, allowing each receiver 44, 46, and 48 to simultaneously receive data and information over each of the three radio channels CH. 37, CH. 38, and CH. 39.

Referring to the example illustrated in FIG. 3, based on the time-delayed and repeating advertising interval of the advertiser 36 and the scan window 44B of the first receiver 44, the first receiver 44 is able to receive data over radio channels CH. 38 and 39 through the second radio 44" and the third radio 44'", respectively. Further, based on the time-delayed and repeating advertising interval of the advertiser 36 and the scan window 46D of the second receiver 46, the second receiver 46 is able to receive data over radio channels CH. 37, 38, and 39 through the first radio 46', the second radio 46", and the third radio 46'", respectively. Lastly, based on the time-delayed and repeating advertising interval of the advertiser 36 and the scan window 48F of the third receiver 48, the third receiver 48 is able to receive data over radio channels CH. 37 and 39 through the first radio 48' and the third radio 48'", respectively.

Therefore, it is clear that the fixed triple channel receiver architecture of the present disclosure results in a significant increase in the amount of received data packets 60 and reduces the amount of lost data packets 62, even when using the same advertising interval, advertising delay, scan interval (44A, 46C, and 48), and scan window (44, 46D, and 48F) as the prior BLE Beacon 10. The received data packets 60 can then be processed downstream in the buffer 40 and/or the processor 42 (FIG. 2) to create a complete single-flow of data or information. The final result of the disclosed fixed triple channel receiver architecture is a reduction in lost data packets 62 and an increased communication range, among other advantages not specifically listed.

As will be appreciated by persons having ordinary skill in the art, the fixed triple channel receiver architecture of the receivers 44, 46, and 48 of the present disclosure provides significant benefits over the prior art single receiver architectures. Specifically, each of the receivers 44, 46, and 48 including three separate radios, with each radio being forced to stay tuned on its own radio channel, allows the receivers 44, 46, and 48 to receive data and information over each of radio channels CH. 37, CH. 38, and CH. 39, compared to the prior art single receiver architectures. As such, the probability of listening on the same channel (e.g. CH. 37, CH. 38, and CH. 39) when the beacon (data and information) is transmitting is increased. This provides a significant increase in the amount of received data packets 60 and reduces the amount of lost data packets 62. Therefore, the fixed triple channel receiver architecture of the receivers 44, 46, and 48 reduces the amount of data packets lost during transmission, which improves the overall reliability and the connection range during data transmission using BLE technology, compared to the prior art single receiver architectures.

Figure 4:
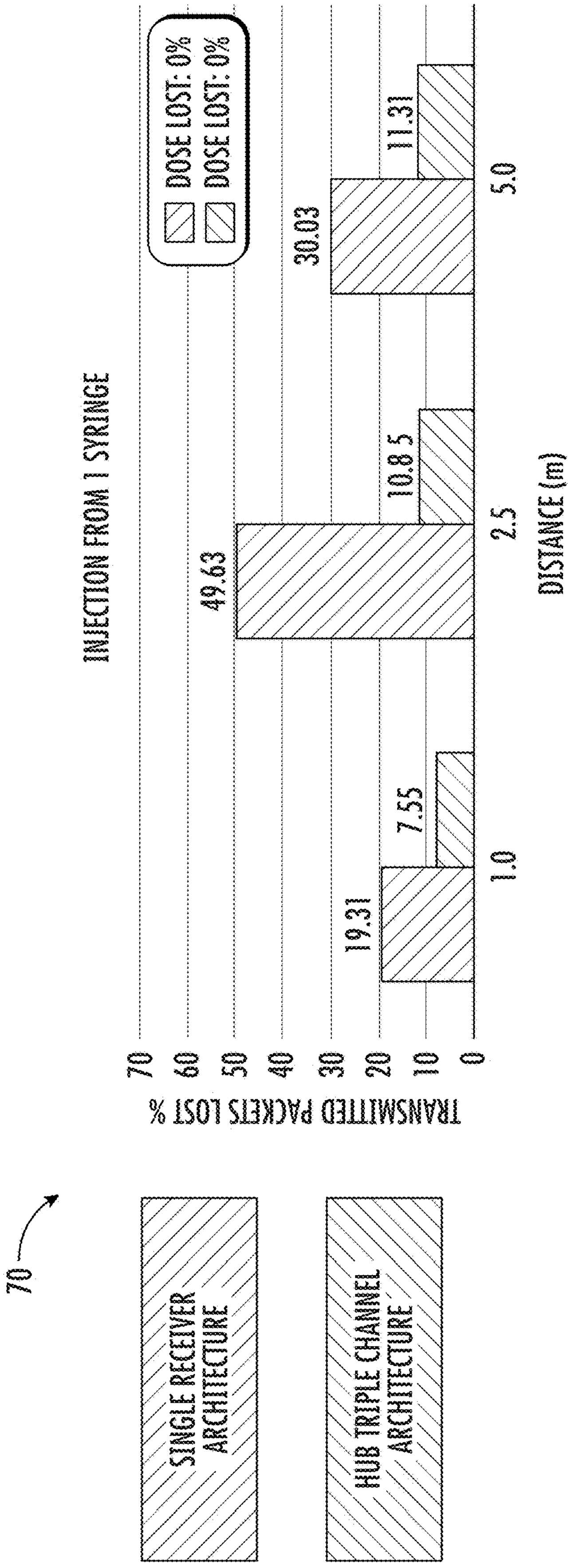
FIG. 4 is a bar graph illustrating results of a comparison between a prior art BLE Beacon and Scanner and a BLE Beacon and Scanner of the present disclosure.

FIG. 4 is a bar graph 70 illustrating results of a comparison between a prior art BLE Beacon and Scanner 14 and a BLE Beacon and Scanner 38 of the present disclosure. The bar graph 70 represents a real case test which measured and compared the number of lost data packets by the single and triple receiver architectures. The prior art BLE Beacon and Scanner 14 is represented by the "Single Receiver Architecture" bars, and the BLE Beacon and Scanner 38 of the present disclosure is represented by the "Hub Triple Channel Architecture" bars. Further, the X-axis represents the distance (in meters) from the advertiser 12 or advertiser 36, and the Y-axis represent the percentage of transmitted packages lost.

As illustrated when the advertiser 12, 36 is 1-meter from the scanners 14, 38, about 19.3% of the transmitted packages are lost for the Single Receiver Architecture (prior art), and about 7.6% of the transmitted packages are lost for the Hub Triple Channel Architecture (present disclosure). When the advertiser 12, 36 is 2.5-meters from the scanners 14, 38, about 49.6% of the transmitted packages are lost for the Single Receiver Architecture (prior art), and about 10.9% of the transmitted packages are lost for the Hub Triple Channel Architecture (present disclosure). When the advertiser 12, 36 is 5-meters from the scanners 14, 38, about 30.0% of the transmitted packages are lost for the Single Receiver Architecture (prior art), and about 11.3% of the transmitted packages are lost for the Hub Triple Channel Architecture (present disclosure).

As is clearly illustrated in the bar graph 70, the fixed triple channel receiver architecture of the receivers 44, 46, and 48 reduces the amount of data packets lost during transmission, which improves the overall reliability and the connection range during data transmission using BLE technology, compared to the prior art single receiver architecture.

Having thus described the present embodiments in detail, it is to be appreciated and will be apparent to those skilled in the art that many physical changes, only a few of which are exemplified in the detailed description of the disclosure, could be made without altering the inventive concepts and principles embodied therein.

It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the disclosure being indicated by the appended claims rather than by the foregoing description, and all alternate embodiments and changes to this embodiment which come within the meaning and range of equivalency of said claims are therefore to be embraced therein.

What is claimed is:

1. An assembly for wirelessly transmitting data using a Bluetooth low energy architecture, the assembly comprises:

a medical device including an advertiser configured to wirelessly transmit or send data related to the medical device; and a hub including a scanner for receiving data from the advertiser, the scanner including at least a first receiver with a first radio, a second radio, and a third radio, wherein the scanner further includes a second receiver with a first radio, a second radio, and a third radio, and a third receiver with a first radio, a second radio, and a third radio;

wherein the first receiver is configured to simultaneously scan for a plurality of radio channels utilizing the first radio, the second radio, and the third radio, and the first receiver is configured to simultaneously receive data from the advertiser over the plurality of radio channels; and wherein the hub further includes a buffer and a processor, the buffer includes:

a first buffer, a second buffer, and a third buffer, with each buffer being communicatively coupled to the first receiver, the second receiver, and third receiver, respectively;

wherein the first buffer, the second buffer, and the third buffer are configured to temporarily store and pre-process data received from the first receiver, the second receiver, and the third receiver, respectively; and wherein the processor is configured to receive the stored and pre-processed data from the first buffer, the second buffer, and the third buffer, sort and remove duplicate data, compile the data into desired output data, and transfer the desired output data through an output of the hub.

2. The assembly of claim 1, wherein the second receiver is configured to simultaneously scan for the plurality of radio channels utilizing the first radio, the second radio, and the third radio.

3. The assembly of claim 2, wherein the second receiver is configured to simultaneously receive data from the advertiser over the plurality of radio channels.

4. The assembly of claim 1, wherein the third receiver is configured to simultaneously scan for the plurality of radio channels utilizing the first radio, the second radio, and the third radio.

5. The assembly of claim 4, wherein the third receiver is configured to simultaneously receive data from the advertiser over the plurality of radio channels.

6. A method of processing data transmitted from a medical device using a Bluetooth low energy architecture, the method comprising:

receiving, at a scanner of a hub, data transmitted by an advertiser of the medical device, the scanner including a first receiver, a second receiver, and a third receiver, each of the first receiver, the second receiver, and the third receiver including a first radio, a second radio, and a third radio;

simultaneously scanning, by each of the first receiver, the second receiver, and the third receiver, radio channels CH. 37, CH. 38, and CH. 39, wherein each radio of each receiver is configured to scan and listen for a fixed one of the radio channels CH. 37, CH. 38, and CH. 39;

simultaneously receiving, by each of the first receiver, the second receiver, and the third receiver, data over the radio channels CH. 37, CH. 38, and CH. 39;

temporarily storing and pre-processing, by a first buffer, data received from the first receiver; temporarily storing and pre-processing, by a second buffer, data received from the second receiver; and temporarily storing and pre-processing, by a third buffer, data received from the third receiver;

receiving, by a processor, stored and pre-processed data from the first buffer, the second buffer, and the third buffer;

sorting and removing, by the processor, duplicate data from the stored and pre-processed data;

compiling, by the processor, the data into desired output data; and transferring the desired output data through an output of the hub.

7. The method of claim 6, wherein the medical device is a disposable medical device that acts as a beacon, and wherein the data comprises Bluetooth low energy advertisement packets including status of the disposable medical device.

8. The method of claim 7, wherein the disposable medical device relies on the Bluetooth low energy advertisement packets to send the status to a central cloud via a Bluetooth low energy gateway.

9. The method of claim 6, wherein the advertiser transmits the data across the radio channels CH. 37, CH. 38, and CH. 39 during an advertising interval, and wherein an advertising delay occurs before a next advertising interval begins.

10. The method of claim 6, wherein each radio of each of the first receiver, the second receiver, and the third receiver is forced to stay tuned on its own radio channel.

11. The method of claim 6, further comprising processing received data packets downstream in the buffer or the processor to create a complete single-flow of data or information.

12. The method of claim 6, wherein transferring the desired output data through the output of the hub comprises transferring the desired output data for viewing and analysis by a user or other device.

13. The method of claim 6, wherein each of the first receiver, the second receiver, and the third receiver includes a scan interval and a scan window, and wherein the scan window is a timeframe within the scan interval in which the respective receiver can receive data or information from the advertiser.

14. A hub configured to receive data from an advertiser of a medical device using a Bluetooth low energy architecture, the hub comprising:

a scanner including a first receiver, a second receiver, and a third receiver, each of the first receiver, the second receiver, and the third receiver including a first radio, a second radio, and a third radio, wherein each radio of each receiver is configured to scan and listen for a fixed one of radio channels CH. 37, CH. 38, and CH. 39, and wherein each of the first receiver, the second receiver, and the third receiver is configured to simultaneously scan for the radio channels CH. 37, CH. 38, and CH. 39 and simultaneously receive data and information over the radio channels CH. 37, CH. 38, and CH. 39;

a buffer including a first buffer, a second buffer, and a third buffer, the first buffer being configured to temporarily store and pre-process data received from the first receiver, the second buffer being configured to temporarily store and pre-process data received from the second receiver, and the third buffer being configured to temporarily store and pre-process data received from the third receiver; and a processor configured to receive stored and pre-processed data from the first buffer, the second buffer, and the third buffer, sort and remove duplicate data from the stored and pre-processed data, compile the data into desired output data, and transfer the desired output data through an output of the hub.

15. The hub of claim 14, wherein the first radio of each of the first receiver, the second receiver, and the third receiver is configured to scan and listen for radio channel CH. 37, wherein the second radio of each of the first receiver, the second receiver, and the third receiver is configured to scan and listen for radio channel CH. 38, and wherein the third radio of each of the first receiver, the second receiver, and the third receiver is configured to scan and listen for radio channel CH. 39.

16. The hub of claim 14, wherein, based on a time-delayed and repeating advertising interval of the advertiser and a scan window of the first receiver, the first receiver is configured to receive data over radio channels CH. 38 and CH. 39 through the second radio and the third radio of the first receiver, respectively.

17. The hub of claim 16, wherein, based on the time-delayed and repeating advertising interval of the advertiser and a scan window of the second receiver, the second receiver is configured to receive data over radio channels CH. 37, CH. 38, and CH. 39 through the first radio, the second radio, and the third radio of the second receiver, respectively.

18. The hub of claim 17, wherein, based on the time-delayed and repeating advertising interval of the advertiser and a scan window of the third receiver, the third receiver is configured to receive data over radio channels CH. 37 and CH. 39 through the first radio and the third radio of the third receiver, respectively.

19. The hub of claim 14, wherein the processor is configured to create a complete single-flow of data or information from received data packets processed downstream in the buffer or the processor.

20. The hub of claim 14, wherein the output of the hub is configured to transfer the desired output data for viewing and analysis by a user or other device.

* * * * *